United States Patent
Garmon et al.

(10) Patent No.: US 8,669,986 B2
(45) Date of Patent: Mar. 11, 2014

(54) METHOD FOR VISUALIZING DATA EXTRACTED FROM A POPULATION OF DATA

(75) Inventors: Edmon D. Garmon, Winston-Salem, NC (US); Marty D. Foulks, Kernersville, NC (US)

(73) Assignee: Volvo Technology of America, Inc., Greensboro, NC (US)

( * ) Notice: Subject to any disclaimer, the term of this patent is extended or adjusted under 35 U.S.C. 154(b) by 368 days.

(21) Appl. No.: 13/123,973

(22) PCT Filed: Oct. 14, 2009

(86) PCT No.: PCT/US2009/005599
§ 371 (c)(1),
(2), (4) Date: Apr. 13, 2011

(87) PCT Pub. No.: WO2010/044848
PCT Pub. Date: Apr. 22, 2010

(65) Prior Publication Data
US 2011/0227927 A1      Sep. 22, 2011

Related U.S. Application Data

(60) Provisional application No. 61/195,998, filed on Oct. 14, 2008.

(51) Int. Cl.
*G06T 11/20* (2006.01)
*G06F 11/30* (2006.01)

(52) U.S. Cl.
USPC .......................... 345/440; 702/179; 702/180

(58) Field of Classification Search
None
See application file for complete search history.

(56) References Cited

U.S. PATENT DOCUMENTS

| | | |
|---|---|---|
| 6,438,511 B1 | 8/2002 | McKenzie et al. |
| 8,043,216 B2 * | 10/2011 | Matsumura .................... 600/438 |
| 2001/0021042 A1 | 9/2001 | Hirota et al. |
| 2003/0128998 A1 | 7/2003 | Nishi |
| 2004/0095255 A1 * | 5/2004 | Namaky et al. .......... 340/815.78 |
| 2006/0149166 A1 * | 7/2006 | Zvuloni ......................... 600/587 |
| 2007/0132572 A1 | 6/2007 | Itoh et al. |
| 2007/0225942 A1 | 9/2007 | Smith et al. |
| 2007/0299945 A1 * | 12/2007 | Lunsford ...................... 709/223 |
| 2008/0033605 A1 | 2/2008 | Daum et al. |
| 2008/0195313 A1 | 8/2008 | Coleman |
| 2008/0309475 A1 * | 12/2008 | Kuno et al. .................... 340/462 |
| 2009/0160861 A1 * | 6/2009 | Nakano ......................... 345/440 |

OTHER PUBLICATIONS

International Search Report for corresponding International Application PCT/US2009/005599.

\* cited by examiner

*Primary Examiner* — Maurice L. McDowell, Jr.
*Assistant Examiner* — Donna J Ricks
(74) *Attorney, Agent, or Firm* — Martin Farrell; Michael Pruden

(57) ABSTRACT

A method for visualizing data in a population of data includes steps of extracting a subject value from a population of data and defining points of interest in the population of data for comparison to the subject value, where the points of interest representing a scale having a minimum value and a maximum value. A target point of interest is selected. The scale is mapped to a graphic gauge display, wherein, points of interest are visually indicated on the graphic display, end points of the graphic gauge display correspond to the minimum value and the maximum value, and the target point of interest is visually indicated at a center of the graphic gauge display. Finally, the subject value is indicated on the graphic gauge display.

18 Claims, 4 Drawing Sheets

17 % Time at Engine Idle

76th Percentile 46.66 % Time in Top Gear

24th Percentile 46.66 % Time in Top Gear

24th Percentile 6.15 Total M.P.G.

67th Percentile

17 % Time at Engine Idle

76th Percentile

METHOD FOR VISUALIZING DATA EXTRACTED FROM A POPULATION OF DATA

This application claims the benefit of U.S. Provisional Patent Application Ser. No. 61/195,998, filed Oct. 14, 2008.

TECHNICAL FIELD

The invention relates to a method for visualizing data selected from a population of data in relation to the data set for the population.

BACKGROUND AND SUMMARY

Commercial vehicles, for example, trucks, are typically equipped with a number and variety of sensors and other devices for collecting data on the operational characteristics of the engine and transmission, the status of various components, and other areas of interest. Putting this information in a form that facilitates understanding, interpreting, and making use of the data is a challenge.

The invention provides a method for visualizing data extracted from a population of data in the context of the population so that the extracted data may be readily understood in relation to the population of data.

According to the invention, the method presents the population of data and the extracted data in the form of an analogue needle gauge, which through long use in a variety of settings (pressure gauges, speedometers, liquid level gauges, etc) has become readily understandable, even intuitive, to users. The display optionally includes a density histogram, indicating the relative placement of the population to the extracted value, and is shown in relation to the needle gauge. The needle gauge may be a dial type gauge or a linear gauge, as described below.

A method for visualizing data in a population of data includes the steps of extracting a subject value from a population of data, defining points of interest in the population of data for comparison to the subject value, the points of interest together representing a scale having a minimum value and a maximum value, selecting a target point of interest, mapping the scale to a graphic gauge display, wherein, points of interest are visually indicated on the graphic display, end points of the graphic gauge display correspond to the minimum value and the maximum value of the population of data, and the target point of interest is visually indicated at a center of the graphic gauge display and, visually indicating the subject value on the graphic gauge display.

According to an embodiment of the invention, the graphic gauge display is illustrated as an analogue dial and the needle is indicated at a selected angle on the dial. According to an aspect of the invention, a sweep of the scale represents an angular change from the minimum value to the maximum value and the target point of interest is illustrated at a top center of the analogue dial. The sweep may be illustrated as a complete circle or an arc.

According to another embodiment, the gauge display is illustrated as a linear graduated scale and the needle is illustrated at a selected linear position. According to an aspect of the invention, a sweep of the scale represents a linear distance from the minimum value to the maximum value and the target point of interest is indicated at a linear center of the graduated scale.

According to another aspect of the invention, a minimum point of the scale and a maximum point of the scale lie outside or at the edge of the population range.

According to the invention, the points of interest are equally distributed on the graphic display, and may be distributed without respect to relative value, that is not scaled over the range of the dial or linear scale. Alternatively, the points of interest may be equally distributed on the graphic according to relative value.

The method of the invention alternatively further includes displaying a density histogram of the population of data in conjunction with the graphic gauge display. According to the invention, frequency in the histogram is represented by color, the darker colors representing higher frequency of occurrence.

According to this aspect of the invention, the method further includes visually indicating the location of the mean value, the $10^{th}$ percentile and the $90^{th}$ percentile of the population on the histogram.

According to yet another aspect of the invention, the method may include storing graphic gauge displays visualizing a population of data and a subject value created at successive points in time, and displaying a series of said displays in sequence to animate a change over time in said subject value and the population.

BRIEF DESCRIPTION OF THE DRAWINGS

The invention will be better understood by reference to the following Detailed Description in conjunction with the appended drawings, in which.

DETAILED DESCRIPTION

Figure 1:
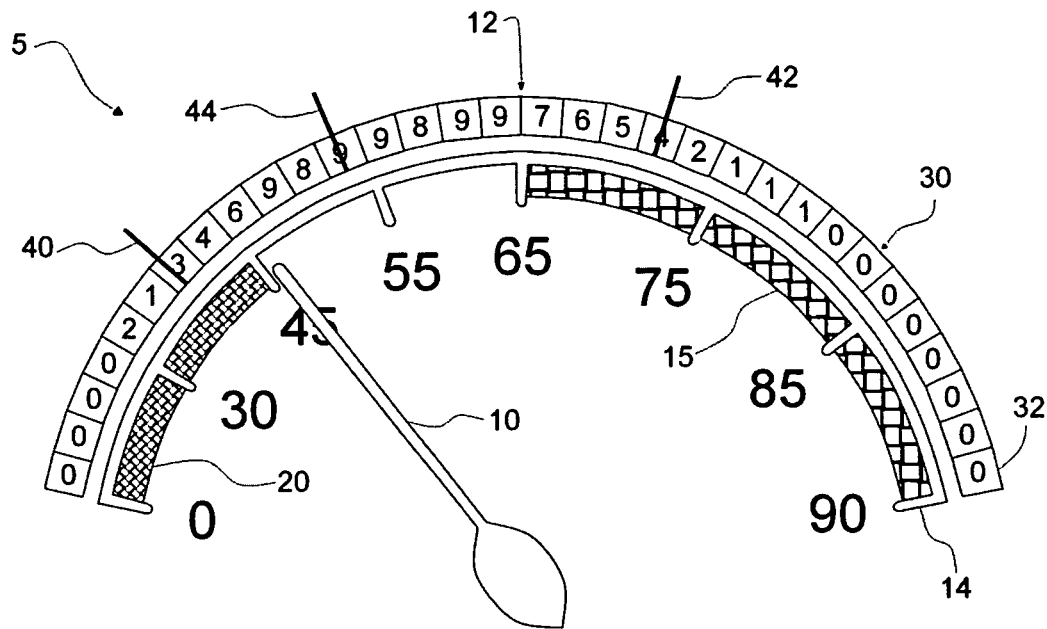
FIG. 1 is an exemplary visualization in the form of a dial gauge of data relating to a vehicle percent time in top gear extracted from a population of vehicles.

The invention provides a method for visualizing data extracted from a population of data in the context of the population so that the extracted data may be readily understood in relation to the population of data. This may have particular use, for example, in managing a fleet of trucks. A fleet owner may wish to collect data on fuel consumption, time operated in the highest gear (which relates to fuel consumption), time spent idling, engine operating temperature, operating time per day, or other operating characteristics. Such data may be collected for the entire fleet, and it may be of interest to compare data for an individual truck or trucks against the data for the entire fleet. The method of invention provides a method for visualizing such comparisons.

The invention is not limited to data for trucks. The method described here may be applied to data collected from a fleet of taxis, service vehicles, a vehicle pool, construction or road building machines, a fleet of aircraft, or other situations where it is of interest to compare the performance of an individual unit against a population of units.

Data may be collected from one or several units by any of several methods and devices or systems, which is not part of the invention.

Once data has been collected, the method includes the step of extracting a subject value from the population. A subject value may be something representing an individual unit in the population, for example, a fuel consumption rate for one vehicle, a percentage of time spent idling for a specified operation time period, a percentage of time at a particular vehicle or engine speed, or in a particular gear for a specified operation time period, or some other data point.

A set of points of interest are then identified in the population of data. The points of interest may be selected to help compare or illustrate the subject value in the context of the population of data. The points of interest may include points representing a minimum and maximum value in the population to establish a range of the population data. Points of interest may be statistical points in the data, for example, average, median, or selected percentile points. Points of interest also or in addition may be selected for business reasons as minimally acceptable and optimum values for the population. Alternatively, or in addition, one or more points of interest may be selected to zoom in within a particular data range, where a scale point is defined, but not visually rendered.

A next step is to identify a target value or target point of interest. The target value may be a particular point of interest for comparison with the subject value. The target value will typically be selected so that the visualization of the subject value to the target has an immediate impression on the viewer of the display. For example, a target value may be a fleet average fuel consumption value, against which the subject value can be illustrated to be at, above or below. As another example, the target value may be a fleet desired fuel consumption value, providing an illustration of the relation of the subject value to the desired value. Other target value criteria may be used.

The identified points of interest, including the minimum and maximum values in the population (which may or may not be points of interest), define a data range. For the type of display to be used, a dial gauge or linear gauge, a next step is to select a sweep for the range. For a dial gauge, the sweep is selected as an angular distance to be portrayed on the gauge, that is, the angle through which a needle could move, for example, a sweep of 160° or some other angle. For a linear gauge, the sweep is the linear distance through which the indicator or needle could move.

The next step is to map the population to the sweep of the gauge display. A visual center point of the sweep is determined, and the target value is assigned to this point. In a dial gauge, the visual center is preferably the top dead center of the gauge. For a linear gauge, the visual center is preferably at the linear midpoint. Minimum value and maximum value are assigned to end points in the sweep.

Next, a scale is constructed. The scale will incorporate and display the range of the data, including the minimum value, center point, and the maximum value, and will display the points of interest between the minimum and maximum values. Preferably, for the purposes of clarity of display, the minimum and maximum points on the scale may be selected to lie outside the range of the data, that is, outside the minimum value and maximum value of the population data.

Using a dial gauge and a sweep angle of display of 160° as an example, the top dead center point is then defined as 0°, to which, as mentioned, the target value is assigned. The portion of the scale to the left of the center point may then be understood as negative and the portion of the scale to the right of the center point may be understood as positive relative to the center point.

A smallest value point of interest is then set at $-\frac{1}{2}$ (sweep angle in degrees), or $-80°$ in this example. A largest value point of interest is then set at $+\frac{1}{2}$ (sweep angle in degrees) or $+80°$. This arrangement will result in visualization that is symmetric relative to the visual center.

Alternatively, as will be described below in connection with FIG. 4, the scale may be asymmetric, with the sweep to the left and right of the center point being unequal. For example, an asymmetric sweep of 110° may be selected, with the smallest value point of interest being set at $-20°$ and the largest value point of interest being set at $+90°$ relative to the center point. The method described herein for a symmetrical display can readily apply to an asymmetric display, as will be understood.

The remaining points of interest are then distributed between $-80°$ and $+80°$ according to the value of the point of interest relative to the smallest value, center point (or target value), and the largest value points of interest. Preferably, points of interest to the left of the center or target value are equally distributed between the minimum value and the target value and points of interest to the right of the target value are equally distributed between the target value and the maximum value. As there may be a different quantity of points of interest on each side of the visual center, the spacing distribution of points of interest on one side of the target value may differ from those on the other side of the target value.

The angular position (angle) of any value point of interest may be interpolated between the two closest points of interest as:

$$\text{Angle}_n = \text{Angle}_{lower} + (\text{Value}_n - \text{Value}_{lower}) * ((\text{Angle}_{upper} - \text{Angle}_{lower}) / (\text{Value}_{upper} - \text{Value}_{lower}))$$

The value of any angle may be interpolated between the two closest points of interest as:

$$\text{Value}_n = \text{Value}_{lower} + (\text{Angle}_n - \text{Angle}_{lower}) * ((\text{Value}_{upper} - \text{Value}_{lower}) / (\text{Angle}_{upper} - \text{Angle}_{lower}))$$

Next, the gauge display is illustrated, that is rendered in visible form. The target value is rendered vertically above the center point of origin. For some visualizations, it may be necessary to illustrate or render only the target value. Next, if desired, points of interest assigned to positive angles are rendered to the right of the center point, and accordingly points of interest assigned to negative angles are rendered to the left of the center point.

The scale is rendered by setting a radius from the center point of origin and drawing an arc at the radius that extends from the minimum value to the maximum value, encompassing the points of interest. Each point of interest may then be rendered by a tick mark on the arc, the tick marks lying on a radius from the axis.

The subject value is then rendered on the gauge display by mapping the subject value to the scale to determine its location angle, and drawing a needle from the axis to the arc at the subject value location angle.

The next step is to render explanatory text. Text is added below the scale stating the value that the needle points to, along with any domain specific explanation of the value. Values for the points of interest are added.

Turning to FIG. 1, which shows an exemplary visualization of "percentage time in top gear" for a vehicle (subject) in a fleet of vehicle (the population) in the form of a dial gauge 5, the figure shows a needle indicator 10 pointing to 46.66% on a scale of 0% to 90%. The value 65% is the target value, set at the top dead center 12, and in this example, represents a desired value for all vehicles in the fleet. Note that there are four points of interest to the left of the target value, 0, 30, 45 and 55, and that these are equally distributed on the scale although the numerical values are not equally differentiated. Similarly, there are three points of interest to the right of top center, 75, 85 and 90 and that these are also equally distributed in the gauge display despite the unequal differences between the numerical values. Each point of interest is indicated by a tick mark 14 and associated value.

With the target value 65% representing a desired value for all vehicles, the method further includes the step of indicating that values from 65% and above represent a desired operation range by rendering a green band 15. For this example, values of 45% and below indicate the particular subject value is below acceptable performance, which according to the method is indicated by including a red band 20 for those values.

By placing the target value at top center 12 in the illustrated dial gauge 5, a viewer can immediately grasp in the visualization of FIG. 1 that the subject value indicated by needle 10 is below the desired target value, and by reference to the numerical values displayed, can quickly calculate the difference.

Figure 2:
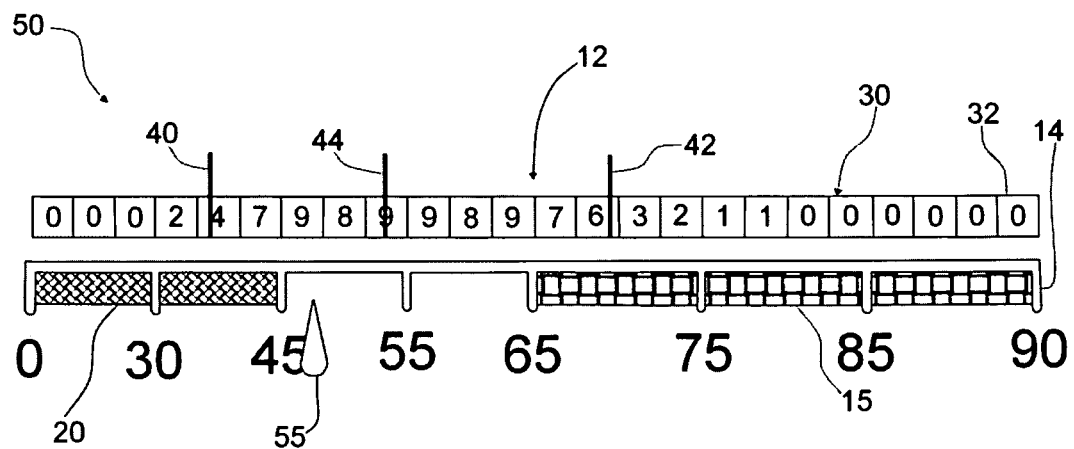
FIG. 2 is an alternative visualization of the data of FIG. 1 in the form of a linear gauge.

Alternatively, a linear gauge 50 may be rendered, as illustrated in FIG. 2. As may be seen, the linear gauge 50 of FIG. 2 shows how the same data in FIG. 1 is visualized in linear gauge display. The linear gauge of FIG. 2 is shown arranged horizontally; alternatively, a vertical arrangement may be used. The location of the subject value is indicated by a marker 55.

The process for visualizing is similar to that explained for the dial gauge, although, rather than an angular sweep, a linear sweep of distance is determined. Using a display sweep distance of 160 units as an example, a center point is then defined as 0, to which, as mentioned, the target value is assigned. The portion of the scale to the left of the center point may then be understood as negative and the portion of the scale to the right of the center point may be understood as positive relative to the center point.

A smallest value point of interest is then set at −½ (sweep distance), or −80 units in this example. A largest value point of interest is then set at +½ (sweep distance) or +80 units. Alternatively, the sweep to the left and right of center may be asymmetrically arranged if of interest for the visualization of the data set.

The remaining points of interest are then distributed between −80 units and +80 units according to the value of the point of interest relative to the smallest value, center point value, and largest value points of interest. The points of interest having a value between the minimum and the target value are equally distributed in the negative region of the scale and the points of interest having a value between the target value and the maximum value are equally distributed on the positive portion of the scale.

The linear position (D) of any value point of interest may be interpolated between the two closest points of interest as:

$$D_n = D_{lower} + (Value_n - Value_{lower}) * ((D_{upper} - D_{lower}) / (Value_{upper} - Value_{lower}))$$

The value of any position may be interpolated between the two closest points of interest as:

$$Value_n = Value_{lower} + (D_n - D_{lower}) * (Value_{upper} - Value_{lower}) / (D_{upper} - D_{lower}))$$

Next, the gauge display is illustrated, that is rendered in visible form. The target value is rendered vertically above the center point 12. Points of interest assigned to positive value locations are rendered to the right of the center point, and accordingly points of interest assigned to negative value locations are rendered to the left of the center point.

The scale is rendered by selecting an actual value (in pixels, for example) for the full length of the scale as it will be rendered and converting the calculated values from arbitrary units to an actual value. Next, a line is drawn that extends from the minimum value to the maximum value, encompassing the points of interest. Each point of interest may then be rendered by a vertical tick mark 14 on the line.

The subject value is then rendered on the linear gauge display by mapping the subject value to the scale to determine its location, and drawing a needle 55 at the subject value location. Explanatory text is then added, as described above in connection with FIG. 1.

Figure 3:
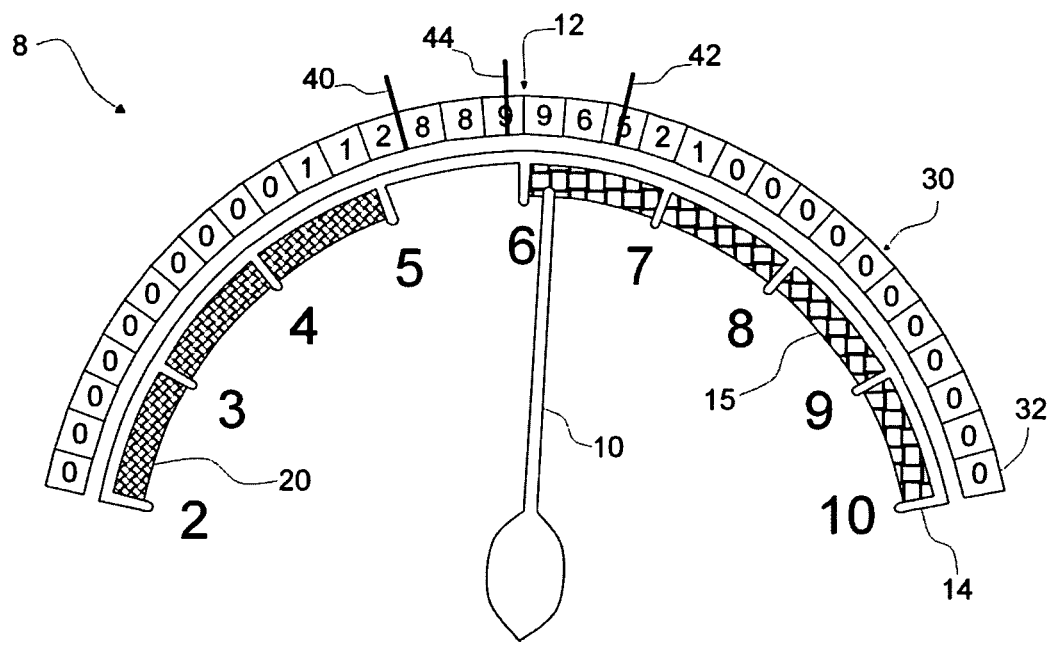
FIG. 3 is an exemplary visualization in the form of a dial gauge of data relating to a vehicle's fuel consumption extracted from a population of vehicles.

Turning to FIG. 3, another example visualization of data is shown. In this figure, an exemplary display 8 of fuel consumption for a subject vehicle within a population of vehicles is shown. Here, the needle 10 indicating the subject value is set to 6.15 miles per gallon, meaning the subject vehicle achieved this fuel consumption in the measured period. The target value of 6 at top center 12 represents an arbitrary selection. The population data ranges from 2 to 10, and there are four points of interest indicated on each side of the top center point. In this example, the points of interest values are equally spaced, as well as being equally distributed on the gauge. Again, the red (undesired)) fuel consumption range 20 is indicated, as well as the green desired range 15.

According to another aspect of the invention, the population data may be rendered as a density graph or histogram along the scale to show the statistical relationship of the subject value to the population. The figures each include a histogram shown in conjunction with the visualized gauge.

Referring in particular to FIG. 1, a density histogram 30 of the population is built and displayed on the dial gauge across the full sweep of the scale. Those of ordinary skill will understand that a linear histogram can be created by converting the following description relating to angles in the sweep to linear distances, as was described in connection with FIG. 2.

A number of buckets 32 or bins, that is, the discrete units in the density histogram, is determined by dividing the scale sweep angle by the preferred size of a population mark. The population mark will include a subset range of values and is defined by a bucket sweep angle.

The bucket sweep angle is calculated as the scale sweep angle divided by the selected number of buckets.

A collection of buckets is then built where the minimum value and maximum value are determined from the scale such that bucket[$n$].maximum=bucket[$n$+1].minimum An angular distance between a bucket[n].minimum and bucket[n].maximum is the bucket sweep angle, such that the entire population falls into the range covered by all buckets. The scale minimum corresponds to the minimum of all buckets and the scale maximum corresponds to the maximum of all buckets The next step is to fill the buckets for the density histogram. The population values are sorted into their appropriate buckets, such that each value that falls within a particular bucket's range, that is a value falling between the minimum and maximum values assigned to the bucket, causes that bucket count to increment.

Once the value count of the buckets has been determined, a count range from smallest bucket to largest bucket is determined. Next, the histogram is rendered. An ordered index of colors is assigned to the count range. In the figure, a numerical value is shown in each bucket to represent the frequency, and accordingly, the color assigned to that bucket. The color band width is determined as:

(maximum(bucket.count)−minimum(bucket.count))/ number_of_buckets

Then, for each bucket, an arc segment is rendered along the radius in the gauge display from the origin, between the angles corresponding to the minimum and maximum values bounding the bucket. Each rendered arc is colored with the color from the predefined list of colors using the index generated as:

Floor(bucket.count/color_band_width)

Next, a mark corresponding to the $10^{th}$ percentile is determined and illustrated on the histogram as a radial tick line 40 from the population density arc at the angle corresponding that value, wherein:

Ceiling(Population count/10)

A mark corresponding to the $90^{th}$ percentile is rendered as a radial tick line 42 from the population density arc at the angle corresponding to that value, wherein:

Population count−Ceiling(Population count/10)

Next, a mark corresponding to the arithmetic mean is added as a radial tick line 44 from the population density arc at an angle corresponding to that value.

The next step is to render explanatory text in the histogram. Text is added below the previous text stating the percentile that the value corresponds with.

Optionally, any domain specific ranges may be rendered against the scale.

Optionally, the gauge and histogram may be animated to show changes in the data over time. Individual gauge displays may be stored over time and displayed as a series of images flashing at a selected rate. The change in the subject value and population densities, for example, may be shown as moving from image to image.

FIG. 1 and FIG. 3 include exemplary histograms for the visualization of the data for, respectively, percentage time in top gear and fuel consumption. The figures show bucket counts, for convenience of the illustrations, which should be understood to represent colors, as described above.

Figure 4:
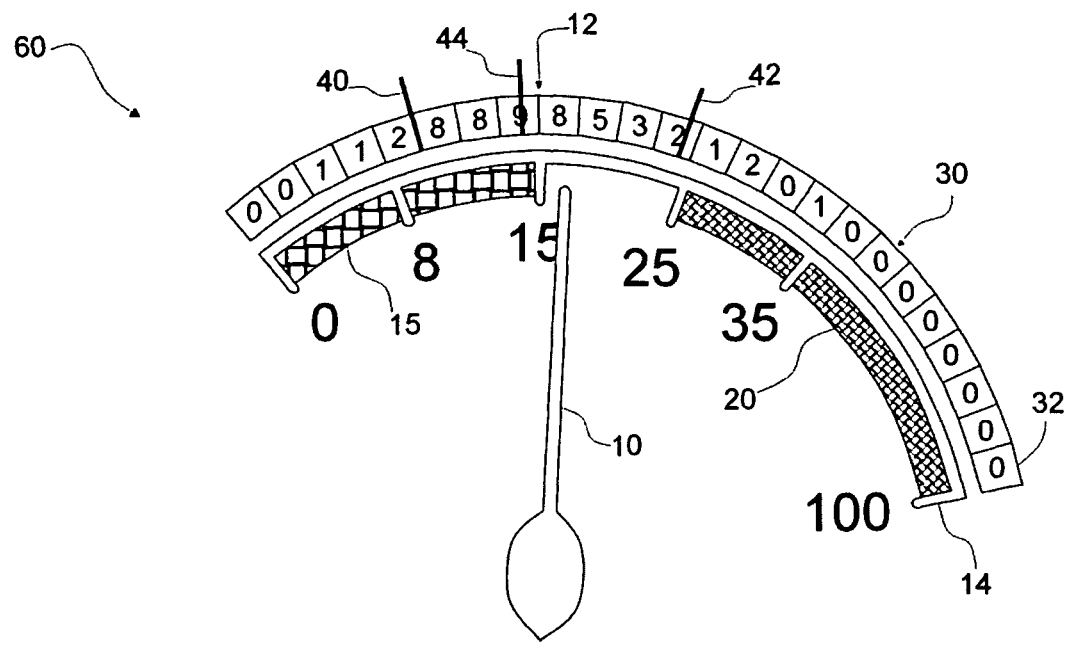
FIG. 4 is an alternative visualization with a non-symmetrical gauge.

FIG. 4 shows an alternative dial gauge display 60 in which the scale is asymmetrically arranged relative to the center point 12. Such a visualization may be of interest where the points of interest on one side of the center point are more significant or of higher interest, for business or technical reasons, than those on the other side of the center point. One example, illustrated here, is percent time at engine idle. In this example, the target value, 15% idle time, is set at top center point 12 for ready visual reference. As may be seen in this example, the gauge 60 is relatively shorter on the left of the center point 12 and relatively extended to the right. The points of interest rendered to the left are illustrated in the green, or desired range 15. The points of interest rendered to the right of the top center point 12 show increasing wasteful idle times, and are accordingly, illustrated in the red, or undesired range 20.

FIG. 4 also shows an example in which at least one point of interest is omitted from the visualization. As described above, the points of interest may be selected to help compare or illustrate the subject value in the context of the population of data, and establish a range of the population data. For some visualizations, it may not be necessary or desired to render every point of interest. In FIG. 4, a point of interest between 35% and 100% has been omitted from the visualization, although this point was selected and used in building the range and scale.

The invention has been described in terms of preferred principles, embodiments, and steps; however, those skilled in the art will recognize that substitutions may be made without departing from the scope of the invention as defined in the appended claims.

What is claimed is:

1. A method for visualizing individual data in a population of data collected for analysis, comprising the steps of:
    extracting a subject value from a population of data which has been collected for analysis;
    defining points of interest in the population of data for comparison to the subject value, the points of interest representing a scale having a minimum value and a maximum value;
    selecting a target point of interest from the defined points of interest in the population data;
    mapping the scale to a graphic gauge display;
    rendering at least the target point of interest visually indicated at a center of the graphic gauge display, wherein, end points of the graphic gauge display correspond to the minimum value and the maximum value; and,
    visually indicating the subject value on the graphic gauge display.

2. The method according to claim 1, wherein a minimum point of the scale and a maximum point of the scale lie outside the population range.

3. The method of claim 1, further comprising rendering defined points of interest visually indicated on the graphic display.

4. The method according to claim 3, wherein the points of interest are equally distributed on the graphic display between an end point and the center point.

5. The method according to claim 3, wherein the points of interest are distributed on the graphic display according to relative value.

6. The method of claim 1, wherein the graphic gauge display is illustrated as an analogue dial and the subject value is illustrated as a needle positioned at a selected angle on the dial.

7. The method of claim 6, wherein the target point of interest is illustrated at top center of the dial.

8. The method according to claim 6, wherein a sweep of the scale represents an angular change from the minimum value to the maximum value and the target point of interest is indicated at a top center of the analogue dial.

9. The method according to claim 8, wherein angular change from the minimum value to the top center is unequal to the angular change from the top center to the maximum value.

10. The method of claim 1, wherein the gauge display is illustrated as a graduated linear scale and the subject value is illustrated as a needle positioned at a linear position.

11. The method according to claim 10, wherein a sweep of the scale represents a linear distance from the minimum value to the maximum value and the target point of interest is illustrated at a linear center.

12. The method according to claim 1, further comprising displaying a density histogram of the population of data in conjunction with the graphic gauge display.

13. The method according to claim 12, wherein frequency in the density histogram is represented by color assigned to each frequency.

14. The method according to claim 12, further comprising visually indicating a location of at least one of the arithmetic mean, the $10^{th}$ percentile and the $90^{th}$ percentile on the density histogram.

15. The method according to claim 1, further comprising storing graphic gauge displays visualizing a population of data and a subject value created at successive points in time, and displaying a series of said displays in sequence to animate a change over time in said subject value.

16. A method for visualizing individual data in a population of data collected for analysis, comprising the steps of:
- extracting a subject value from a population of data collected for analysis;
- defining points of interest in the population of data for comparison to the subject value, the points of interest representing a scale having a minimum value and a maximum value;
- selecting a target point of interest from the defined points of interest in the population data;
- mapping the scale to a graphic gauge display;
- rendering at least the target point of interest visually indicated at a center of the graphic gauge display, wherein, end points of the graphic gauge display correspond to the minimum value and the maximum value;

visually indicating the subject value on the graphic gauge display; and,
- displaying a density histogram of the population of data in conjunction with the graphic gauge display.

17. The method according to claim 16, wherein frequency in the density histogram is represented by color assigned to each frequency.

18. The method according to claim 16, further comprising visually indicating a location of at least one of the arithmetic mean, the $10^{th}$ percentile and the $90^{th}$ percentile on the density histogram.

* * * * *